United States Patent Office 3,780,012
Patented Dec. 18, 1973

3,780,012
PRODUCTION OF TALL OIL ROSIN PENTAERYTHRITOL ESTERS HAVING IMPROVED COLOR
William Richard Smith, Panama City, Fla., assignor to Arizona Chemical Company, New York, N.Y.
No Drawing. Filed Dec. 18, 1972, Ser. No. 316,146
Int. Cl. C09f *1/04*
U.S. Cl. 260—97.5                    4 Claims

ABSTRACT OF THE DISCLOSURE

There is provided a process for improving the color of a tall oil rosin pentaerythritol ester by pretreating a tall oil rosin with from 0.5% to 2.5% paraformaldehyde at a temperature of from 140° C. to 180° C. for from one to three hours, distilling the same, and thereafter effecting the esterification of the so-treated tall oil rosin with pentaerythritol at a temperature ranging from about 250° C. to 300° C.

---

The present invention relates to the esterification of tall oil rosin. More particularly, it relates to the esterification of tall oil rosin with pentaerythritol. Still more particularly, the invention is concerned with the pretreatment of tall oil rosin with catalytic amounts of paraformaldehyde and distilling it prior to effecting esterification, whereby the color of the resultant ester is markedly improved.

It is well known that normally obtained gum or wood rosin can be readily reacted with pentaerythritol to obtain the corresponding esters of rosin grade often as light as WG or WW. Unfortunately, tall oil rosin when esterified with pentaerythritol deteriorates considerably colorwise usually dropping from a rosin color of WW or WG to H or I. Thus, in the many applications where light color is of consequence or importance, tall oil rosin per se cannot be successfully employed in an esterification to obtain a highly light colored tall oil ester.

It is, therefore, a principal object of the invention to prepare a lightly colored tall oil rosin ester prepared from the esterification of pentaerythritol. It is a further object of the invention to prepare a tall oil rosin ester of pentaerythritol of M or better. Other objects and advantages will become self evident from a reading of the ensuing disclosure.

According to the process of the present invention, it has been unexpectedly found that the color of a tall oil rosin pentaerythritol ester is markedly improved by initially pretreating the tall oil rosin with catalytic amounts of paraformaldehyde and distilling it prior to esterification with the desired polyhydric alcohol.

In general a tall oil rosin is pretreated with from about 0.5% to about 2.5% paraformaldehyde, the percentage being by weight based on the weight of the tall oil rosin. The temperature of the pretreatment ranges from about 140° C. to about 180° C. for from one to three hours, and distilling said heated rosin in any known manner. Usually, the distillation occurs at temperatures ranging from about 220° C. to 280° C. at pressures from about 60 mm. Hg to about 350 mm. Hg. Thereafter, the esterification is effected by reaction with at least an equivalent amount of pentaerythritol at a temperature ranging from about 250° C. to about 300° C. for from five to ten hours. If the pretreatment is not effectuated, there is obtained a highly darkened esterification product.

The rosin color standards referred to herein are United States Department of Agriculture standards varying from X, the lightest, to the darkest color, D. The color scale is designated as X, WW, WG, N, K, I, H, G, F, E, and D.

The invention will be better understood by referring to the examples provided below which are to be taken as merely illustrative. Unless otherwise specified, the parts and percentages are by weight.

EXAMPLE 1

This example illustrates tall oil rosin pentaerythritol ester formation absent the pretreatment of tall oil rosin.

To a suitable reaction vessel equipped with stirrer and thermometer are added 100 parts of tall oil rosin having a color of WW. There are next added 12 parts of pentaerythritol and 0.05% calcium hydroxide as the catalyst, based on the weight of the tall oil rosin. The mixture is finally heated to 275° C. for eight (8) hours.

Resultant tall oil rosin pentaerythritol ester is found to have the color I as measured against the USDA rosin standards.

EXAMPLE 2

This example illustrates the formation of gum or wood rosin pentaerythritol ester formation.

Repeating the procedure of Example 1 in every detail except that gum rosin having a color of WW is esterified with pentaerythritol. The color of the resultant ester is found to be unaffected by the esterification process.

Wood rosin of WW grade is substituted for gum rosin in the above example. No color change is noted subsequent to pentaerythritol esterification.

EXAMPLE 3

This example illustrates the present invention.

The procedure of Example 1 is followed in every detail except that the tall oil rosin is initially pretreated with paraformaldehyde as follows: 100 parts of tall oil rosin is admixed with 1% paraformaldehyde and heated to a temperature of 145° C. for two hours and distilled at 260° C. under a pressure of 60 mm. Hg. To so-treated tall oil rosin is next subjected to the pentaerythritol esterification reaction. There is obtained a tall oil rosin pentaerythritol ester having a WW-WG rosin color.

EXAMPLE 4

The procedure of Example 3 is repeated in every detail except that the temperature of the tall oil rosin paraformaldehyde mixture is increased to 160° C. for one hour and distilled at 250° C. under a pressure of 85 mm. Hg. The so pretreated rosin is next esterified with sufficient pentaerythritol to recover the corresponding fully esterified product having a color of WW.

I claim:

1. In a process for esterifying tall oil rosin with pentaerythritol to obtain the corresponding ester, the improvement which comprises: contacting a tall oil rosin with from about 0.5% to about 2.5% of paraformaldehyde at a temperature ranging from about 140° C. to about 180° C. for from one to three hours, distilling the so treated tall oil rosin and thereafter effecting the esterification of the so-treated tall oil rosin with pentaerythritol at a temperature ranging from about 250° C. to about 300° C.

2. The method according to claim 1 in which the pretreatment temperature is maintained at 145° C. for two hours prior to distillation and esterification.

3. The method according to claim 1 where the distillation is effected at temperatures ranging from 220° C.–280° C. and at pressures from 60 mm. Hg to about 350 mm. Hg.

4. The method according to claim 1 wherein at least equivalent amounts of pentaerythritol and tall oil rosin acids are reacted.

References Cited

UNITED STATES PATENTS 3,423,389   1/1969   Wheelus _____ 260—97.5

PHILIP E. ANDERSON, Primary Examiner
W. E. PARKER, Assistant Examiner

U.S. Cl. X.R.

260—104